United States Patent [19]

Moore

[11] 4,169,918

[45] Oct. 2, 1979

[54] ARRANGEMENT FOR LIMITING PRESSURE DEVELOPED IN A CLOSED CONTAINER

[75] Inventor: George E. Moore, Scotia, N.Y.

[73] Assignee: General Electric Company, Gainesville, Fla.

[21] Appl. No.: 899,581

[22] Filed: Apr. 24, 1978

[51] Int. Cl.$^2$ .................................... H01M 10/52
[52] U.S. Cl. ............................ 429/57; 429/86; 429/120; 429/159
[58] Field of Search ............ 429/86, 57, 159, 120, 429/176; 204/22.9; 55/189; 165/13

[56] References Cited

U.S. PATENT DOCUMENTS

| | | | |
|---|---|---|---|
| 1,583,648 | 5/1926 | Benner | 429/86 |
| 1,770,974 | 7/1930 | Everett | 429/86 |
| 2,615,062 | 10/1952 | Craig | 429/86 |
| 3,258,360 | 6/1966 | Kordesch | 429/57 |

*Primary Examiner*—Anthony Skapars

*Attorney, Agent, or Firm*—Morgan, Finnegan, Pine, Foley & Lee

[57] ABSTRACT

An arrangement for limiting the pressure developed by the combination of gases of a gaseous mixture, such as hydrogen and oxygen in a closed container, for example, in a rechargeable battery. The arrangement includes material having substantial heat capacity and having a high surface-to-volume ratio disposed in free spaces in the container wherein the hydrogen and oxygen may accumulate during the charging or discharging of the battery. When the hydrogen and oxygen combine to form a gaseous product or vapor at a high pressure, the gaseous product is cooled by the aforementioned material to limit the pressure to an amount below that capable of causing rupture of the container. The material may further, in the case of a condensible vapor such as that formed by the combination of hydrogen and oxygen effect a temperature reduction which results in condensation of the vapor to further reduce the pressure to insure against rupture of the container.

21 Claims, 3 Drawing Figures

ARRANGEMENT FOR LIMITING PRESSURE DEVELOPED IN A CLOSED CONTAINER

BACKGROUND OF THE INVENTION

1. Field of the Invention

This invention relates to an arrangement for limiting the pressure developed within a closed container and, more particularly, for limiting the pressure developed by a potentially explosive gaseous mixture in rechargeable batteries.

2. Description of the Prior Art

When a device such as a battery containing a plurality of electrochemical cells within a closed container is charged or discharged, hydrogen and oxygen gases are generated by the decomposition of the electrolyte of the cells and accumulate in the battery. Since the hydrogen and oxygen are within a closed space, there is always the possibility of the development of excessive pressure caused by the combination of the hydrogen and oxygen. The combination of these gases results in a sudden pressure rise that can burst the container enclosing the cells as well as damage surrounding equipment and be hazardous to personnel. This problem exists not only with respect to sealed containers for batteries but also in vented containers because the pressure relief vents may be inadequate for relieving such excessive pressure build-up. The problem can also be encountered in a system containing purging means to prevent accumulation of explosive gases, where the purging means fails to purge the container adequately. The problem is also encountered in environments other than batteries where potentially explosive gaseous mixtures may accumulate in a confined space.

One solution for reducing the hazards of gases in a battery includes the provision of a stronger container having the capacity to withstand such sudden increases in pressure. However, such a container would add considerable expense and weight to the device. It has also been proposed to increase the flexibility of the container walls so that they may expand, thus increasing the container volume to accommodate for the pressure build-up. However, it would be desirable to contain the resulting gases with little or no change in the shape and size of the container, particularly the container of a battery for an automobile or aircraft, for example, wherein there is limited space to accommodate the battery.

Another prior art solution includes the use of activated charcoal to absorb gas. The activated charcoal is not effective, however, where space and weight constraints must be taken into account because of the large quantity of charcoal required to absorb evolved gas.

Still another prior art solution includes the reaction of oxygen with the hydrogen gas in the presence of a palladium catalyst to form water. The reaction of oxygen with the hydrogen gas in the presence of the palladium catalyst has proven to be unreliable because of the poisoning of the palladium by the reaction. A further refinement of this prior art solution is to use palladium oxide as a catalyst in lieu of the palladium since only a small quantity of palladium oxide is required and the palladium oxide is not poisoned by the reaction. Although the palladium oxide limits pressure build-up, the hazard caused by the evolution of hydrogen gas is not entirely eliminated, and the evolved hydrogen in the presence of oxygen may still represent a mixture which is capable, upon combination, of generating pressures many times greater than the original ambient pressure.

By this invention, the disadvantages and limitations of the prior art are overcome, and an arrangement is provided for limiting the pressure increases developed by the combination of gases of a gaseous mixture to a level which eliminates the possibility of rupture of the container enclosing the gaseous mixture.

Accordingly, it is an object of this invention to provide an arrangement for limiting the pressure generated within a closed container, such as a battery, by the combination of gases formed therein to a level below that causing rupture of the container.

It is another object of this invention to provide an arrangement for limiting pressure increases within a container without substantially increasing the weight of the container.

It is still another object of this invention to provide an arrangement for limiting pressure increases within a container to prevent damage to the contents of the container as well as the external surroundings of the container.

SUMMARY OF THE INVENTION

In one form thereof, this invention is directed to an arrangement for limiting the pressure associated with the combination of gases of a gaseous mixture in a container, particularly such a mixture developing in a rechargeable battery. The arrangement is particularly applicable to a gaseous mixture which is capable of combining to develop an excessive pressure of a condensible vapor. The arrangement comprises a material having a substantial heat capacity per unit volume and having a high surface-to-volume ratio disposed in free spaces within the rechargeable battery. The gases of the gaseous mixture may combine to form a gaseous product or vapor at a pressure which may be of sufficient magnitude to rupture the container. The material, acting as a heat sink, effects a substantial reduction in the temperature normally resulting from the combination of the gases, the reduction in temperature being sufficient to limit the pressure to a level insufficient to cause rupture of the container. The material may also effect a reduction in temperature which causes condensation of the vapor and thereby further limits the pressure to insure against rupture of the container.

DESCRIPTION OF THE PREFERRED EMBODIMENT

Figure 1:
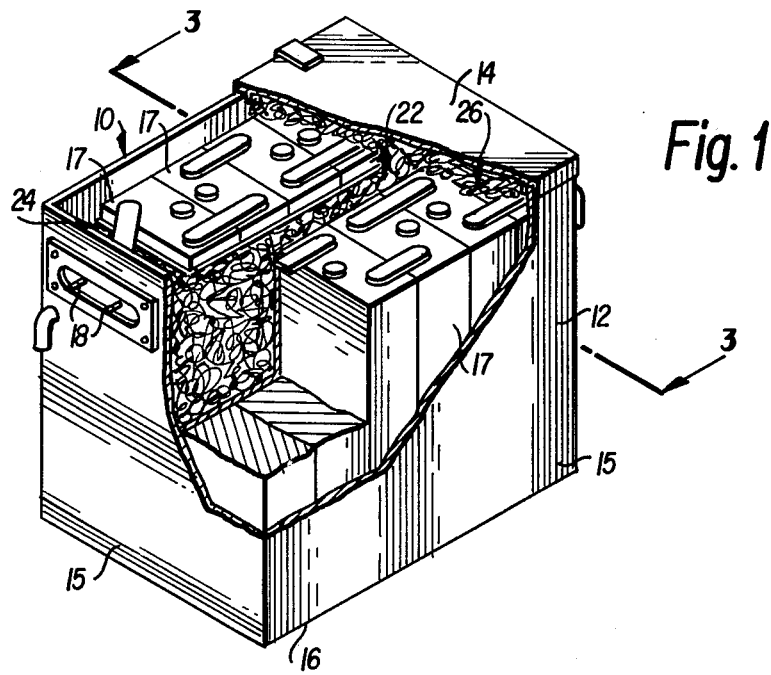
FIG. 1 is a perspective view, partially cut away, of a battery incorporating the arrangement of the invention.
Figure 2:
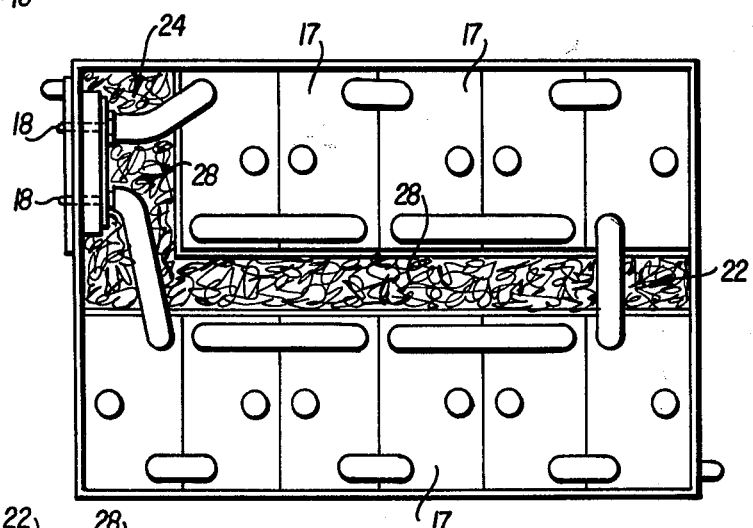
FIG. 2 is a top view of the battery shown in FIG. 1, with the top wall removed to show more clearly the internal construction.
Figure 3:
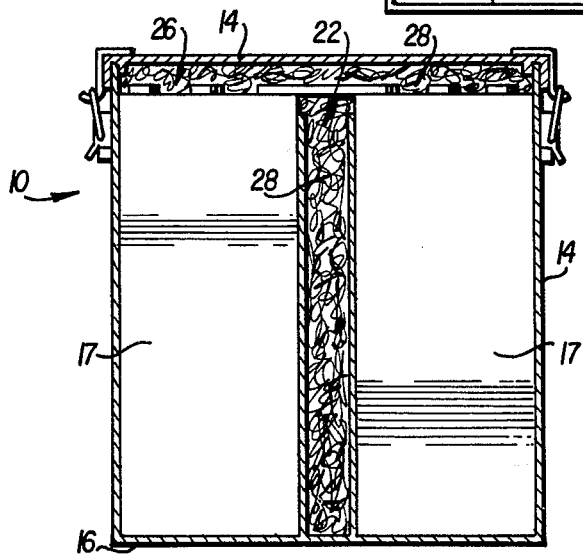
FIG. 3 is a sectional view taken along lines 3—3 in FIG. 1.

Referring now to FIG. 1, there is shown a battery 10 which includes a container 12. The container includes a top wall 14, side walls 15 and a bottom wall 16. The container 12 houses a plurality of cells 17 which are connected in series to provide a predetermined voltage at terminals 18 which extend through one of the side walls 15 of the container 12. The cells 17 contain an electrolyte of potassium hydroxide which develops a mixture of hydrogen and oxygen during charging and discharging of the battery. This mixture is capable of combining to form a gaseous product at a pressure sufficiently high to cause rupture of the container 12.

While most of the volume of the container is occupied by cells 17, there are free spaces between and around the cells and a free space between the cells and the top wall of the container. These free spaces are small with respect to the entire volume of the container; however, they are sufficiently large to allow hydrogen and oxygen gases to accumulate therein. The gases may be generated in sufficient quantity that, upon combination, they may cause development of a pressure which is sufficiently high to cause rupture of the container 12.

The development of a pressure sufficient to rupture the container is an abnormal occurrence and it is undesirable to incur substantially added weight in all batteries manufactured in order to meet this abnormal condition in isolated cases. In the arrangement of this invention provision is made for limiting the pressure so that rupture of the container is prevented without requiring a stronger container having added material and added weight.

In accordance with the invention, two parallel rows of cells 17 are placed in a portion of the battery container 12, with the cells defining a first free space 22 therebetween. Second and third free spaces 24 and 26, respectively, are also defined by the placement of the cells 17 in container 12. Free space 24 is formed between the cells 17 and terminals 18, and free space 26 is formed between the cells 17 and the top wall 14 of the container. A material 28 having particular characteristics is placed in the free spaces 22, 24 and 26, as shown in the drawing. Specifically, the material 28 has: (1) a high surface-to-volume ratio to enhance the heat transfer from the hot gaseous product to the material and (2) a substantial heat capacity per unit volume in order to absorb a substantial fraction of the heat developed, that is, it serves as a heat sink. This material, in one preferred embodiment, is steel wool, but other materials of similar form, such as glass wool or other similar fibrous or sponge-like materials, would be similarly effective.

In accordance with this invention, a substantial portion of the free space within the battery container not taken up by the cells is filled with the material 28. The surface-to-volume ratio of the material is important, but the more important requirement of the material is sufficient heat absorption capability, or effective heat capacity per unit volume. This effective heat capacity of the material is the product of three factors: its true specific heat, its true density and its volume fraction as packed. The product of the first two of these factors or properties ranges from about 0.4 to 0.8 cal/cm$^3$-°C. for materials suitable for use in the arrangement of this invention, but may be taken with sufficient accuracy as the same for all such materials and equal to approximately 0.6 cal/cm$^3$-°C.

The third factor (the volume fraction) can be arbitrarily varied, but is of course related to and should be consistent with the required surface-to-volume ratio. As a rough rule, the effective heat capacity per unit volume of the material 28 should be larger than that of the gaseous product from the same volume of gaseous mixture (usually about $4 \times 10^{-4}$ cal/cm$^3$-°C. at atmospheric pressure) by a factor equal to that by which it is desired to reduce the possible pressure occurring upon combustion of the gaseous mixture. Thus, for example, if it is desired to reduce the expected pressure ratio by a factor of ten, the minimum volume fraction should be approximately: $10 \times (4 \times 10^{-4})/0.6 = 0.007$. In practice, it should be made considerably larger than this calculated minimum to assure adequate heat capacity, and also the required surface-to-volume ratio which is more difficult to estimate and to specify accurately. Accordingly, a value of 0.05 for the volume fraction, or 5% of the true density of the material, is recommended.

The thermal conductivity of the substance determines the rate of temperature equalization within the fibers or particles of the material, but its variation among materials of possible interest would be of minor significance generally. The important step in approaching temperature equalization of the gaseous product with the material is the transfer of heat from the hot combustion products to the relatively cold packing material. It obviously depends on the surface-to-volume ratio, and it takes place under a large but rapidly decreasing temperature difference. The rate of this complex, unsteady heat transfer must be such that it occurs in a time related to the rate of the combustion process in these uncertain and varying conditions. Neither rate can be estimated accurately, but with reasonable assumptions about the combustion and heat transfer processes involved, the surface-to-volume ratio required for a large reduction in gas temperature and pressure may be estimated as roughly 100 to 500 cm$^2$/cm$^3$, a range readily attainable in commonly available wool-type materials.

An additional factor in reducing the pressure in the particular embodiment described is that upon combination of the hydrogen and oxygen, a potentially explosive pressure of condensible vapor, that is, steam, is formed within the container. The condensation of the vapor to liquid, i.e., from steam to water, reduces the resulting transient pressure rise which would normally be associated with the combination of the hydrogen and oxygen beyond the reduction in pressure resulting from the reduction in temperature of the vapor by the absorption of heat therefrom by the material. Upon the formation of the vapor, it expands into the free spaces occupied by the material 28, and the material effects a substantial reduction in the temperature normally resulting from the formation of the vapor and a corresponding reduction in the pressure to limit the pressure in the container to a level which in below that at which rupture of the container would occur. Moreover, this reduction in temperature may be sufficient to reduce the temperature to a point where condensation of the vapor occurs to further reduce the pressure in the container to insure against rupture of the container. Thus, for example, because of the cooling of the vapor effected by this invention, the associated pressure ratio can be reduced from a value of about 7 which might otherwise occur to about 2 or less. The amount of the pressure reduction depends on the aforementioned characteristics of the material 28. The thermal conductivity of the material is of lesser significance than the heat capacity of the material, that is, its capacity for acting as a heat sink. Thus, glass wool, while having a thermal conductivity about 1/50 of that of steel wool, has reasonable values of the other properties of greater importance to the arrangement of this invention and is an effective material for use in this arrangement. For this reason materials having a wide range of thermal conductivity can be expected to be satisfactory for purposes of this invention.

As much of the free spaces 22, 24 and 26 as is convenient should be filled with the material 28, since where there is no material to cool the hot combustion products there will tend to be locally higher pressure. While such localized higher pressures would be attenuated by cooling in neighboring areas of the material 28, the allowable fraction of the free spaces which is not filled with the material 28 would depend on what is an acceptable pressure rise in a given situation which will still prevent rupture of the container 12. In the case of batteries it is estimated that approximately 80% of the volume of the free space should be filled with the material 28.

If the material 28 is steel wool or other metallic material, that is, electrically conductive, it is necessary to insulate it from the cells of the battery. The reason is that the battery cell terminals are normally exposed and the steel wool or other metallic electrically-conducting material, in contact with the terminals, could short-circuit the battery. Also, where a material, such as glass wool, which is not electrically conductive is employed, it may still be necessary to insulate the material from the terminals because the wetting of the glass wool by the potassium hydroxide electrolyte may provide a conducting path. This can be readily accomplished by coating the terminals with an organic insulating material which is chemically resistant to alkalis, such as the potassium hydroxide electrolyte employed in batteries.

While the invention has been described with respect to utilization of such an arrangement in a battery containing cells which may generate hydrogen and oxygen, and this is a particular field of usefulness of this invention, this invention can be applied to many other devices in which there is a risk of rupture of a container because of the formation, accumulation or storage of gaseous mixtures capable of developing excessively high pressures in a container. For example, the invention can be utilized to minimize the transient explosion hazard in nuclear reactor off-gas hold-up pipes when there is no recombiner for the gas. It is intended, therefore, that the invention not be limited to the particular embodiment shown and described and that the appended claims should cover such modifications as fall within the spirit and scope thereof.

I claim:

1. An arrangement for limiting the pressure increase associated with the formation of a gaseous mixture and the combination of said gaseous mixture to form a gaseous product at high pressure, said arrangement comprising:
   (a) an enclosed container;
   (b) said container including a source of said gaseous mixture;
   (c) said container further including a free space adjacent said source of gaseous mixture; and
   (d) a heat absorbent material disposed in said free space and occupying not less than about 80% by volume of said free space as packed, the product of the specific heat and true density of said material being at least about 0.4 cal/cm$^3$-°C;
   (e) said material being present in a volume fraction, as packed, of not less than about 0.05 and effecting a substantial reduction in the temperature normally resulting from the combination of said gaseous mixture to thereby reduce the pressure resulting from said combination to a level below that capable of causing rupture of said container.

2. The arrangement as recited in claim 1, wherein said gaseous product is a condensible vapor and said reduction in temperature effected by said material is sufficient to cause condensation of said vapor for further reducing said pressure to insure that said pressure is below that capable of causing rupture of said container.

3. The arrangement as recited in claim 1, wherein said gaseous mixture comprises hydrogen and oxygen, said hydrogen and oxygen being capable of combining to form said gaseous product at high pressure.

4. The arrangement as recited in claim 1, wherein said material is glass wool.

5. The arrangement as recited in claim 1, wherein said material is steel wool.

6. An arrangement for limiting the pressure increase in a rechargeable battery associated with the formation of a gaseous mixture and the combination of said gaseous mixture to form gaseous product at a high pressure, said arrangement comprising:
   (a) an enclosed container;
   (b) at least one cell disposed in said container, said cell containing an electrolyte capable of developing a gaseous mixture that is combinable to form a condensible vapor at high pressure;
   (c) said container including a free space in communication with said cell;
   (d) terminals extending through said container, said terminals being electrically connected to said cell;
   (e) a heat absorbent material disposed in said free space and occupying not less than about 80% by volume of said free space as packed, said material having a substantial heat capacity per unit volume and having a high surface-to-volume ratio; and
   (f) said material being present in sufficient quantity to effect a substantial reduction in the temperature normally resulting from the combination of said gaseous mixture by the absorbing heat therefrom, thereby to reduce the pressure resulting from said combination to a level below that capable of causing rupture of said container.

7. The arrangement as recited in claim 6, wherein said material is electrically conductive and wherein said arrangement further includes insulating means interposed beween said terminals and said material for insulating said terminals from said material.

8. The system as recited in claim 7, wherein said insulating means comprises a coating on said terminals of an organic insulating material chemically resistant to alkalis.

9. A rupture-resistant rechargeable battery comprising:
   (a) a container having bottom, side and top walls;
   (b) two parallel rows of rechargeable cells having a first space therebetween;
   (c) terminals extending through said container and connected to said cells;
   (d) a second space adjacent said terminals;
   (e) a third space between said cells and the top wall of said container;
   (f) said cells containing an electrolyte capable of developing a mixture of hydrogen and oxygen, said mixture of hydrogen and oxygen being capable of combining to form a condensible vapor at high pressure;
   (g) a material disposed in said first, second and third spaces, said material having a substantial heat capacity per unit volume and having a high surface-to-volume ratio; and
   (h) said material effecting a substantial reduction in the temperature normally resulting from the combination of said hydrogen and oxygen to thereby reduce the pressure resulting from said combination, said reduction in temperature being sufficient to normally limit said pressure to a level below that capable of causing rupture of said container, said reduction in temperature being further sufficient to cause condensation of said vapor for further reducing the pressure to an amount below that capable of causing rupture of said container.

10. The battery as recited in claim 9, wherein the product of the specific heat of said material and the true density of said material is approximately 0.6 cal/cm$^3$-°C. and the volume fraction of material employed is approximately 5% of the true density of said material.

11. The battery as recited in claim 9, wherein said material is glass wool.

12. The battery as recited in claim 9, wherein said material is electrically conductive and further including insulating means interposed between said terminals and said material for insulating said terminals from said material.

13. The battery as recited in claim 12, wherein said insulating means comprises a coating on said terminals of an organic insulating material chemically resistant to alkalis.

14. The battery as recited in claim 13, wherein said material is steel wool.

15. The arrangement of claim 1, wherein said material substantially completely occupies said free space.

16. The arrangement of claim 1, wherein said source of gaseous mixture is an electrochemical cell having electrical terminals, the arrangement further comprising terminal means at the exterior of said container interconnected with said cell electrical terminal.

17. The arrangement of claim 6, wherein the product of the specific heat of said material and the true density of said material is not less than about 0.6 cal/cm$^3$-°C.

18. The arrangement of claim 17, wherein the volume fraction of the material, as packed, is at least about 0.05 based on the true density thereof.

19. The arrangement of claim 6, wherein a plurality of such electrochemical cells is disposed in said container.

20. The arrangement of claim 19, wherein said electrochemical cells are electrically interconnected to form a battery.

21. The arrangement of claim 6, wherein said reduction in temperature brought about by the presence of said material is sufficient to cause condensation of said vapor and thereby to reduce further said pressure.